United States Patent
Sridhar et al.

(10) Patent No.: US 9,071,666 B2
(45) Date of Patent: Jun. 30, 2015

(54) EDGE ROUTER AND METHOD FOR DYNAMIC LEARNING OF AN END DEVICE MAC ADDRESS

(75) Inventors: Kamakshi Sridhar, Plano, TX (US); Ludwig Pauwels, Beveren (BE)

(73) Assignee: Alcatel Lucent, Boulogne-Billancourt (FR)

( * ) Notice: Subject to any disclaimer, the term of this patent is extended or adjusted under 35 U.S.C. 154(b) by 230 days.

(21) Appl. No.: 11/956,321

(22) Filed: Dec. 13, 2007

(65) Prior Publication Data
US 2008/0270673 A1 Oct. 30, 2008

Related U.S. Application Data

(60) Provisional application No. 60/914,225, filed on Apr. 26, 2007.

(51) Int. Cl.
*G06F 12/06* (2006.01)
*H04L 29/12* (2006.01)
*H04L 12/28* (2006.01)
*H04L 12/751* (2013.01)

(52) U.S. Cl.
CPC ........ *H04L 61/6022* (2013.01); *H04L 12/2856* (2013.01); *H04L 12/2874* (2013.01); *H04L 12/2879* (2013.01); *H04L 29/12839* (2013.01); *H04L 45/02* (2013.01)

(58) Field of Classification Search
USPC ....................................................... 709/223
See application file for complete search history.

(56) References Cited

U.S. PATENT DOCUMENTS

| | | | |
|---|---|---|---|
| 6,195,705 B1 | 2/2001 | Leung | |
| 2002/0087671 A1* | 7/2002 | Weisser et al. | 709/223 |
| 2003/0177215 A1* | 9/2003 | Sutherland et al. | 709/223 |
| 2005/0099951 A1* | 5/2005 | Mohan et al. | 370/241 |
| 2005/0152370 A1* | 7/2005 | Meehan et al. | 370/393 |
| 2007/0014290 A1* | 1/2007 | Dec et al. | 370/390 |
| 2008/0046597 A1 | 2/2008 | Stademann | |
| 2009/0129386 A1* | 5/2009 | Rune | 370/392 |

FOREIGN PATENT DOCUMENTS

| | | |
|---|---|---|
| EP | 1628458 A1 | 2/2006 |
| WO | 2004043013 A1 | 5/2004 |

OTHER PUBLICATIONS

PCT Search Report for PCT Patent Application No. PCT/US2008/005275 dated Aug. 7, 2008.
Technical Report "Migration to Ethernet-Based DSL Aggregation", DSL Forum TR-101, Apr. 2006, pp. 1-101.
ITU-T Y.1731 "OAM Functions and Mechanisms for Ethernet Based Networks", May 2006, pp. 1-80.
IEEE P802.1ag/D8 "Draft Standard for Local and Metropolitan Area Networks—Virtual Bridged Local Area Networks—Amendment 5: Connectivity Fault Management" Feb. 8, 2007, pp. 1-248.

* cited by examiner

*Primary Examiner* — Bunjob Jaroenchonwanit
(74) *Attorney, Agent, or Firm* — Capitol Patent & Trademark Law Firm, PLLC (57) ABSTRACT

An edge router (Broadband Remote Access Server) and a method are described herein that obtain a Media Access Control (MAC) address of an end device (consumer premises equipment). Once, the edge router obtains the MAC address of the end device then it can use Ethernet Operation, Administration and Maintenance (OAM) tools to troubleshoot the end device.

19 Claims, 8 Drawing Sheets

EDGE ROUTER AND METHOD FOR DYNAMIC LEARNING OF AN END DEVICE MAC ADDRESS

CLAIM BENEFIT OF PRIOR FILED U.S. APPLICATION

This application claims the benefit of U.S. Provisional Patent Application Ser. No. 60/914,225 which was filed on Apr. 26, 2007 the contents of which are hereby incorporated by reference herein.

TECHNICAL FIELD

The present invention relates to an edge router (e.g., BRAS) and a method for obtaining a Media Access Control (MAC) address of an end device (e.g., consumer premises equipment).

BACKGROUND

The following abbreviations are herewith defined, at least some of which are referred to in the following description associated with the prior art and the present invention.
ATM Asynchronous Transfer Mode
BRAS Broadband Remote Access Server
BTV Broadcast Television
CC Connectivity Check
DA Destination Address
DSL Digital Subscriber Line
DSLAM Digital Subscriber Line Access Multiplexer
IEEE Institute of Electrical and Electronics Engineers
IP Internet Protocol
IPTV Internet Protocol Television
LB Loopback
LBR Loopback Reply
LT Line Termination (customer-side of a DSLAM)
NT Network Termination (network-side of a DSLAM)
MAC Media Access Control
MEP Maintenance End Point
OAM Operation, Administration and Maintenance
OLT Optical Line Termination
ONT Optical Network Termination
PON Passive Optical Network
RGW Residential Gateway
SA Source Address
TV Television
VCI Virtual Connection Identifier
VPI Virtual Pipe Identifier Referring to FIGS. 1-2 (PRIOR ART), there are two block diagrams of a traditional access network 100 with Ethernet-based DSL aggregation (e.g., see DSL Forum TR-101). The traditional access network 100 (e.g., IPTV network 100) includes a regional network 102 which is coupled to an edge router 104 (e.g., BRAS 104 with ports 105) which is coupled to one or more aggregation nodes 106 (with ports 106a and 106b). The aggregation node(s) 106 are connected by an Ethernet access network 108 to multiple access nodes 110 (e.g., DSLAMs 110 each of which include a NT card 113 which has NT exterior-facing ports 113a and NT interior-facing ports 113b and a LT card 115 which has LT interior-facing ports 115a and LT exterior facing ports 115b). The DSLAMs 110 are connected to multiple CPEs 112 (RGWs 112) which in turn are associated with multiple customers 114 where there is normally one customer 114 associated with one CPE 112. In one application, the BRAS 104 transmits BTV traffic 118 (multiple TV channels 118) at the Ethernet level (level 2) downstream via the aggregation node(s) 106, the Ethernet access network 108, the DSLAMs 110, and the CPEs 112 to the customers 114. The basic architecture and functionality of the traditional access network 100 is well known to those skilled in the art but for additional details about this type of architecture reference is made to DSL Forum TR-101 Ethernet-based DSL aggregation dated April 2006 (the contents of which are hereby incorporated by reference herein).

Figure 1:
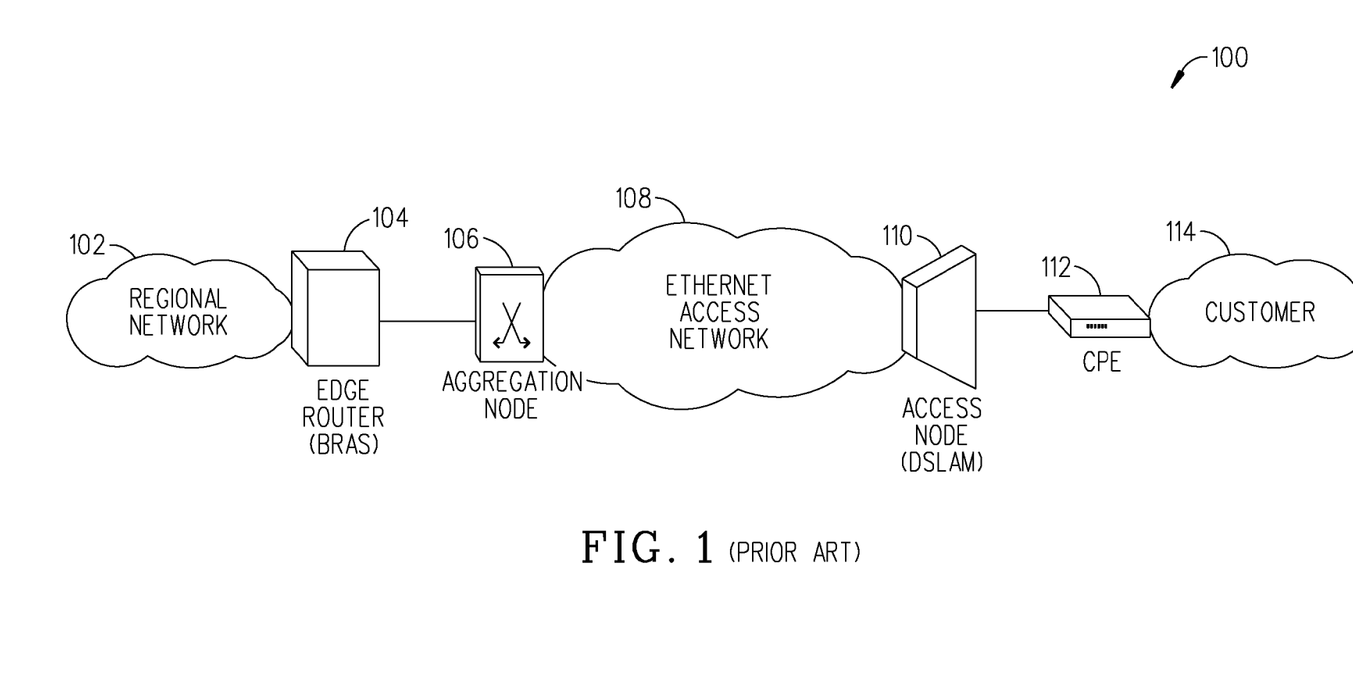
FIGS. 1-2 (PRIOR ART) are two diagrams of a traditional access network (e.g., IPTV network) which are used to help explain a problem that is solved by the present invention.
Figure 2:
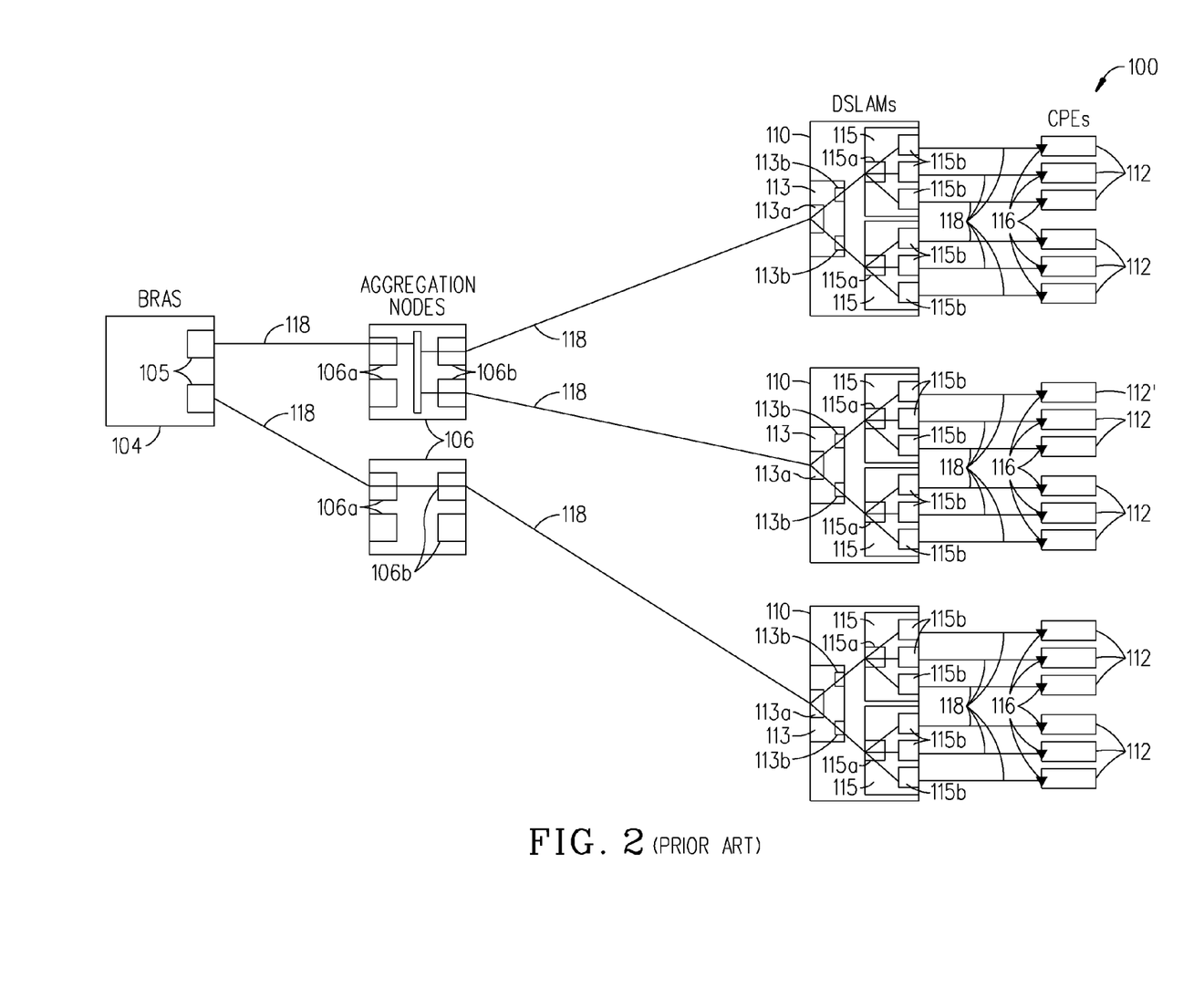

The traditional access network 100 typically implements a connectivity fault management scheme (EthCFM or EthOAM) that has been disclosed in the IEEE 802.1 ag/D8 standard entitled "Virtual Bridged Local Area Networks-Amendment 5: Connectivity Fault Management" Feb. 8, 2007 (the contents of which are incorporated by reference herein). In one application, the BRAS 104 may use this standard to send an Ethernet OAM loopback message to test the connectivity of a particular CPE 112'. However, before the BRAS 104 can send the loopback message to test the connectivity of a particular CPE 112' it needs to know the MAC address of the particular CPE 112'. Unfortunately, the standard assumes that the BRAS 104 would apriori know the MAC addresses of all of the CPEs 112. In the past, the operator enabled the BRAS 104 to learn the MAC address of the CPEs 112 by ensuring a MEP 116 is pre-configured (with a unique MEP-id) in each of the CPEs 112. Then, the operator pre-configured the BRAS 104 to have knowledge about the MEPs 116 in each of the CPEs 112. Thereafter, the BRAS 104 used in-band 802.1ag CC messages containing information about the CPE's MEPs 116 to learn the corresponding MAC addresses of the CPEs 112. This approach has two problems: 1) it is not scalable in an access network 100 that has many thousands of CPEs 112 (i.e., the BRAS 104 can not send just one CC message to learn the MAC address of one particular CPE 112'); and 2) there is a security issue because a hacker could generate CC messages with a false MEP-id and as such the BRAS 104 would obtain and then link the wrong MAC address to the CPE's MEP. Accordingly, there has been a need and still is a need for addressing this shortcoming and other shortcomings that are associated with the traditional access network 100. This need and other needs are satisfied by the present invention.

SUMMARY

In one aspect, the present invention provides a method that could be implemented by an edge router (e.g., BRAS) to obtain a MAC address of an end device (e.g., CPE). The method comprises the steps of: (a) obtaining a virtual MAC address that represents a bridge port in an access node (e.g., DSLAM, ONT-OLT) behind which there is located the end device (e.g., CPE); (b) sending a first connectivity fault management message with a destination address set to the virtual MAC address, where the access node receives the first connectivity fault management message and then sends a second connectivity fault management message with a destination address set to a multicast MAC address towards the end device; and (c) receiving a third connectivity fault management message from the end device where the third connectivity fault message has a source address that is set to a MAC address of the end device.

In another aspect, the present invention provides an edge router (e.g., BRAS) with a processor that retrieves instructions from a memory and processes those instructions to enable the following: (a) obtaining a virtual MAC address that represents a bridge port in an access node (e.g., DSLAM, ONT-OLT) behind which there is located an end device (e.g., CPE); (b) sending a first connectivity fault management message with a destination address set to the virtual MAC address, where the access node receives the first connectivity fault management message and then sends a second connectivity fault management message with a destination address set to a multicast MAC address towards the end device; and (c) receiving a third connectivity fault management message from the end device where the third connectivity fault message has a source address that is set to a MAC address of the end device.

In yet another aspect, the present invention provides a method for obtaining a MAC address of an edge device which is part of an access system that also includes an edge router and a plurality of access nodes, where the method comprising the steps of: (a) obtaining a virtual MAC address at the edge router, where the virtual MAC address represents a bridge port in one of the access nodes behind which there is located the end device; (b) sending a unicast loopback message with a destination address set to the virtual MAC address from the edge router towards the end device; (c) receiving the unicast loopback message at the access nodes; (d) discarding the unicast loopback message at all of the access nodes which do not recognize the virtual MAC address; (e) sending a multicast loopback message from one of the access nodes which recognized the virtual MAC address, where the one access node has the bridge port behind which there is located the end device, and where the multicast loopback message has a destination address set to a multicast MAC address; (f) receiving the multicast loopback message at the end device; (g) sending a unicast loopback reply message from the end device, where the unicast loopback reply message has a source address set to a MAC address of the end device; and (h) receiving the unicast loopback reply message at the edge router so the edge router is able to obtain the MAC address of the end device from the received unicast loopback reply message.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

Figure 3:
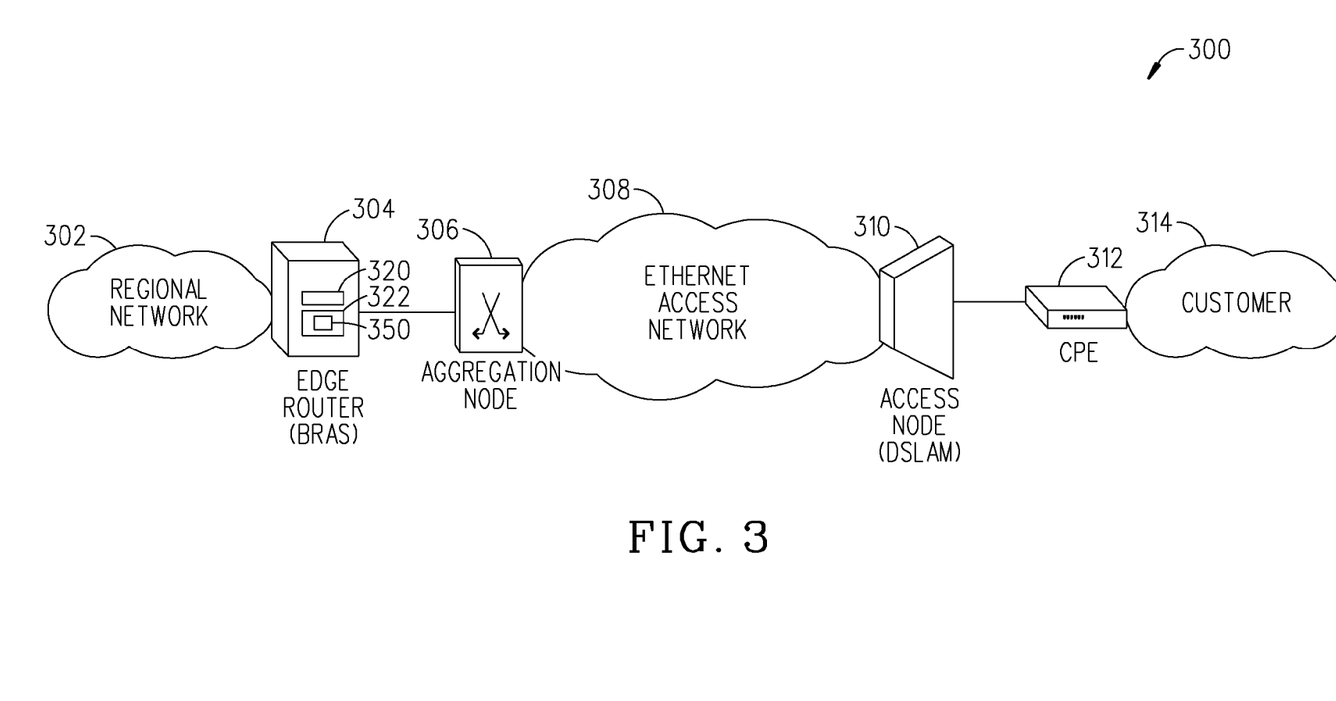
FIGS. 3-4 are two diagrams of an access network (with an Ethernet-based DSL aggregation) which has an edge router (e.g., BRAS) that implements a method for obtaining a MAC address of a particular end device (e.g., CPE) in accordance with the present invention.
Figure 4:
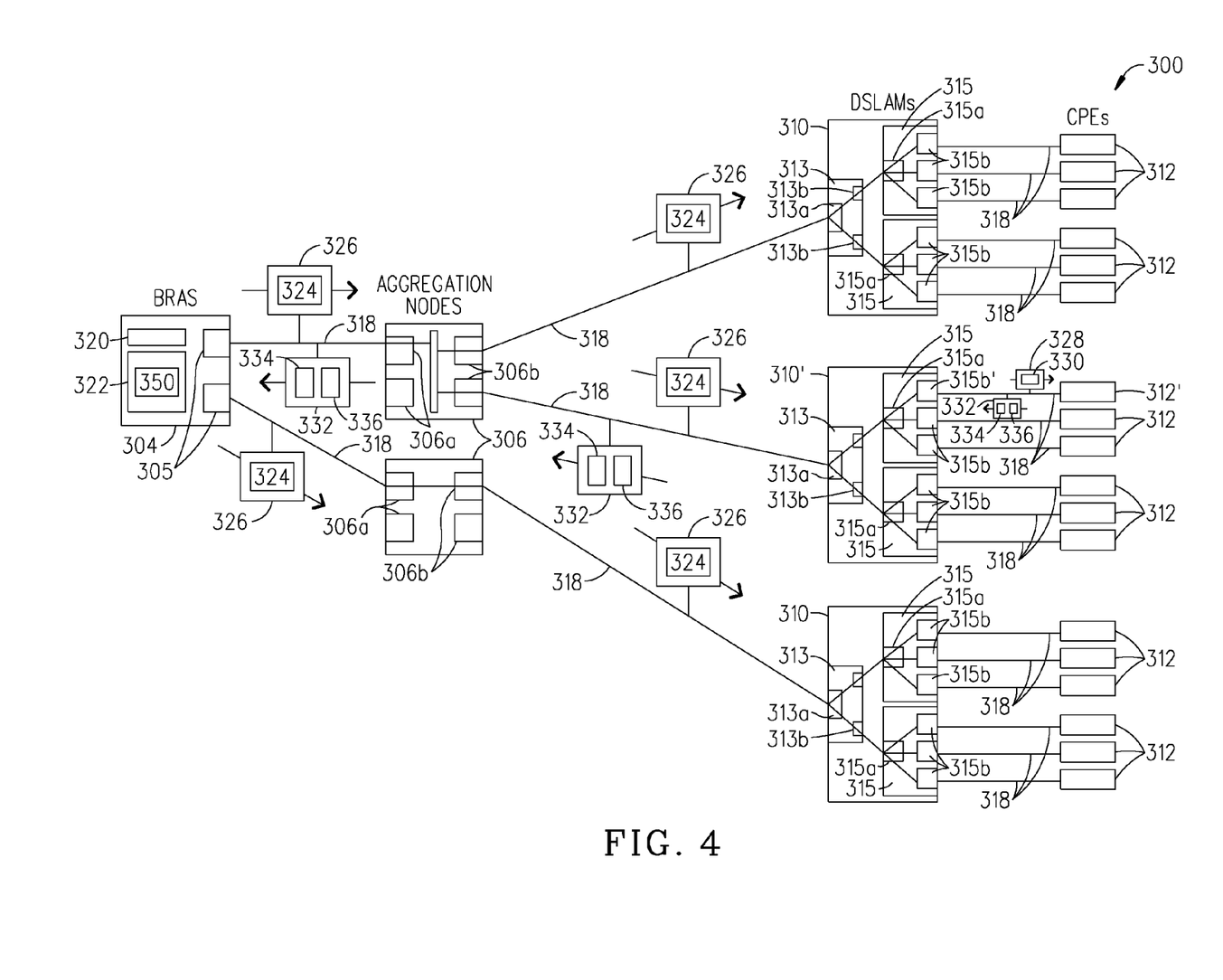

Referring to FIGS. 3-4, there are two block diagrams of an access network 300 (with an Ethernet-based DSL aggregation) which has an edge router 304 (e.g., BRAS 304) that implements a method 350 for obtaining a MAC address of an end device 312 (e.g., CPE 112) in accordance with the present invention. The access network 300 (e.g., IPTV network 300) includes a regional network 302 which is coupled to an edge router 304 (e.g., BRAS 304 with ports 305) which is coupled to one or more aggregation nodes 306 (with ports 306*a* and 306*b*). The aggregation node(s) 306 are connected by an Ethernet access network 308 to multiple access nodes 310 (e.g., DSLAMs 310 each of which include a NT card 313 which has NT exterior-facing ports 313*a* and NT interior-facing ports 313*b* and a LT card 315 which has LT interior-facing ports 315*a* and LT exterior facing ports 315*b*). The DSLAMs 310 are connected to multiple CPEs 312 (RGWs 312) which in turn are associated with multiple customers 314 where there is normally one customer 314 associated with one CPE 312. In one application, the BRAS 304 transmits BTV traffic 318 (multiple TV channels 318) at the Ethernet level (level 2) downstream via the aggregation node(s) 306, the Ethernet access network 308, the DSLAMs 310, and the CPEs 312 to the customers 314.

Figure 5:
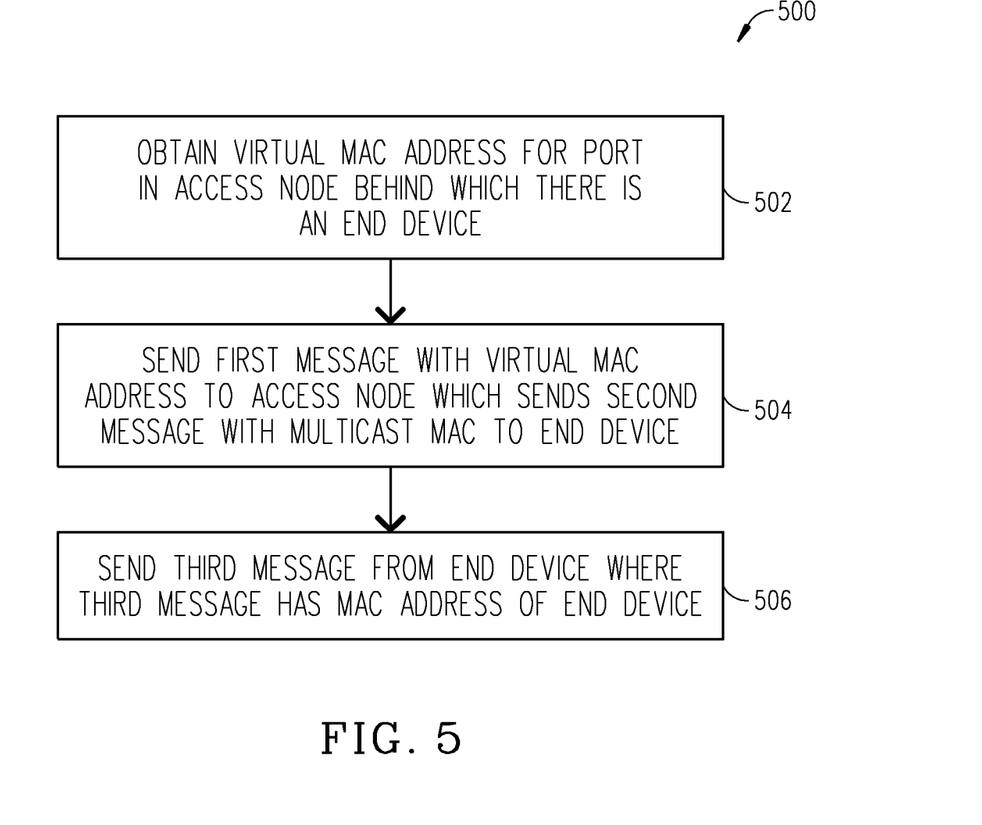
FIG. 5 is a flowchart illustrating the basic steps of the method for obtaining the MAC address of a particular end device (e.g., CPE) in accordance with the present invention.

In the present invention, the BRAS 304 has a processor 320 that retrieves instructions from a memory 322 and processes those instructions to implement a MAC address learning method 350 (see flowchart in FIG. 5). In one embodiment, the BRAS 304 implements method 350 to learn the MAC address of a particular CPE 312' by obtaining a virtual MAC address 324 that represents a bridge port 315*b*' in the DSLAM 310' behind which there is located the particular CPE 312' (see step 502). For example, the BRAS 304 can be pre-configured to store the virtual MAC address 324 associated with the particular CPE 312'. Alternatively, the BRAS 304 can use the known hierarchy of the access network 300 and in particular the DSLAM 310' to calculate the virtual MAC address 324 that corresponds with the particular CPE 312' (this scheme is discussed in greater detail below).

Thereafter, the BRAS 304 outputs a first connectivity fault management message 326 with a destination address set to the virtual MAC address 324 (step 504). The BRAS 304 floods the first connectivity fault management message 326 throughout the access network 300 because the virtual MAC address 324 is not known inside the access network 300 (see FIG. 4). Each DSLAM 310 receives the first connectivity fault management message 326 and all of the DSLAMs 310 discard the first connectivity fault management message 326 except one DSLAM 310' which recognizes the virtual MAC address 324 because it has the port 315*b*' behind which is located the particular CPE 312'. This DSLAM 310' sends a second connectivity fault management message 328 having a destination address set to a multicast MAC 330 towards the CPE 312'. The CPE 312' receives the second connectivity fault management message 328 and then sends a third connectivity fault management message 332 which has a source address set to the CPE's MAC address 334 and a destination address set to the BRAS's MAC address 336. Lastly, the BRAS 304 receives the third connectivity fault management message 332 and obtains therefrom the MAC address 334 of the particular CPE 312' (step 506). Once, the BRAS 304 has the CPE's MAC address 334 it is then able to use Ethernet OAM tools to troubleshoot the CPE 312'.

Figure 6:
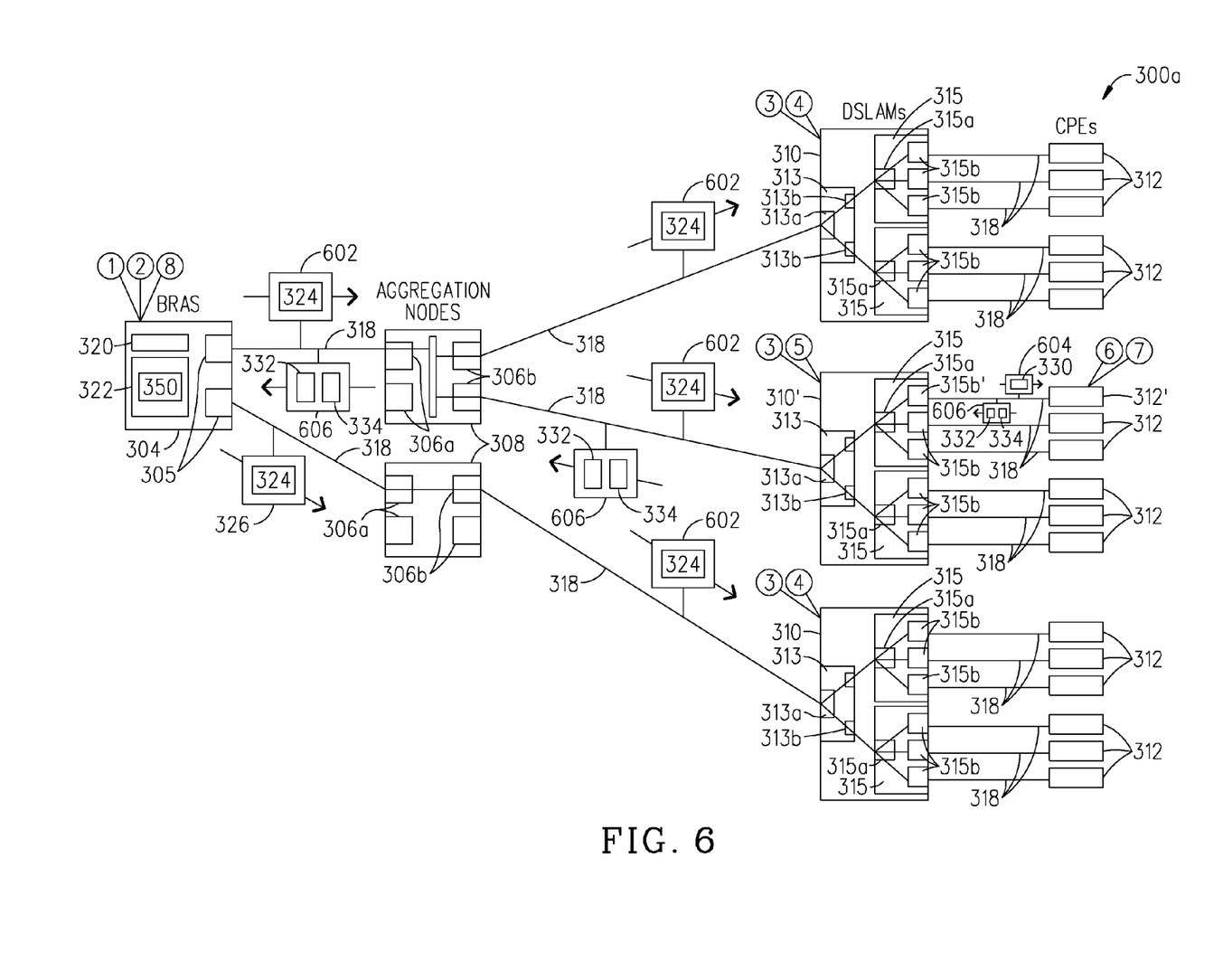
FIG. 6 is a diagram of an exemplary access network which is used to help explain how the method can be implemented in accordance with a first embodiment of the present invention.

Referring to FIG. 6, there is a block diagram of an access network 300a which is used to help explain how the MAC address learning method 350 can be implemented in accordance with a first embodiment of the present invention. The steps of how this particular embodiment of the MAC address learning method 350 can be implemented are as follows:

1. The BRAS 304 obtains a virtual MAC address 324 which represents a bridge port 315b' in one of the DSLAMs 310' behind which there is located a particular CPE 312'. In this case, assume the BRAS 304 would like to obtain the MAC address 334 of this particular CPE 312'. The BRAS 304 could obtain this virtual MAC address 324 by being pre-configured to store the virtual MAC addresses 324 for all of the CPEs 312. Alternatively, the BRAS 304 could obtain this virtual MAC address 324 by using the known hierarchy of the DSLAM 310' to calculate the virtual MAC address 324 that is associated with the particular CPE 312'. For example, the BRAS 304 can use the known hierarchy of the DSLAM 310' to calculate the virtual MAC address 324 by using an identification number of the DSLAM 310' and a rack-shelf-slot-port identification that is associated with the relevant bridge port 315b' behind which there is located the CPE 312'. If desired, the virtual MAC address 324 can be any unique MAC address that represents the particular CPE 312' at the peer side of a port 315b' in the respective DSLAM 310'.

Figure 7:
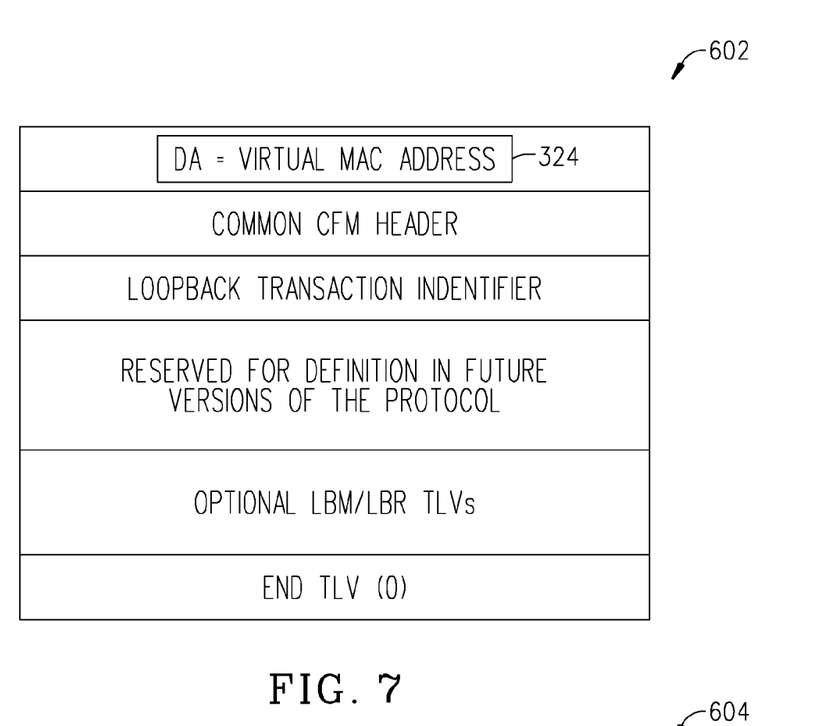
FIG. 7 is a diagram which illustrates the frame format of an exemplary unicast loopback message which is discussed with respect to the access network shown in FIG. 6 in accordance with the present invention.

2. The BRAS 304 sends a unicast loopback message 602 with a destination address set to the virtual MAC address 324 towards the CPE 312'. The unicast loopback message 602 is flooded throughout the access network 300a because the virtual MAC address 324 is not known within the access network 300a. FIG. 7 is a diagram which illustrates the frame format of an exemplary unicast loopback message 602 with a DA set to the virtual MAC address 324.

3. The DSLAMs 310 receive the unicast loopback message 602.

4. The DSLAMs 310 which do not recognize the virtual MAC address 324 within the unicast loopback message 602 discard the unicast loopback message 602. In this example, there are two DSLAMs 310 which discard the unicast loopback message 602 (see top and bottom DSLAMs 310 shown in FIG. 6).

Figure 8:
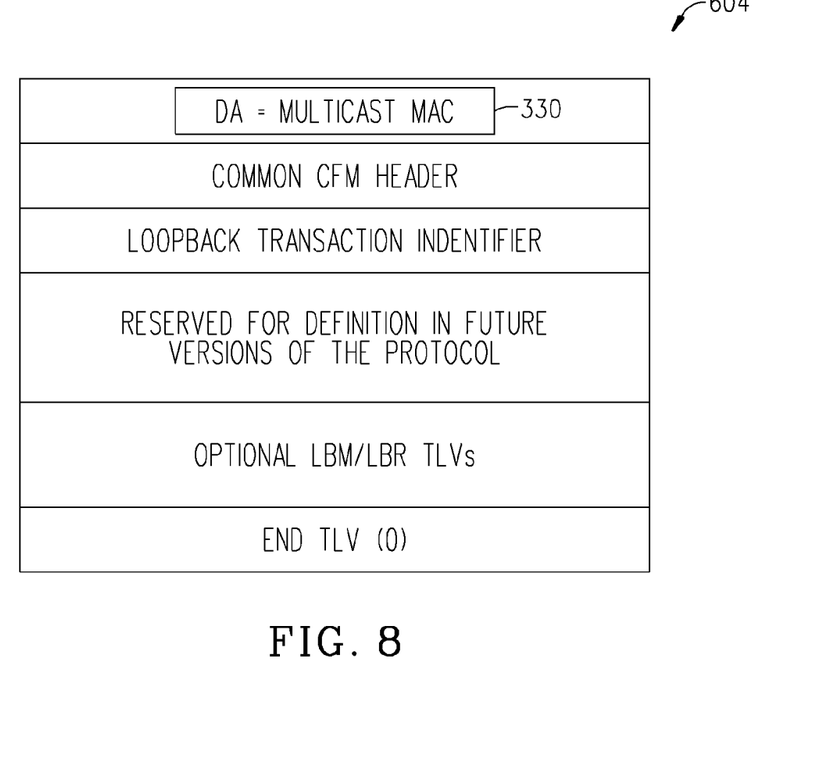
FIG. 8 is a diagram which illustrates the frame format of an exemplary multicast loopback message which is discussed with respect to the access network shown in FIG. 6 in accordance with the present invention.

5. The one DSLAM 310' that recognizes the virtual MAC address 324 in the received unicast loopback message 602 then functions to output a multicast loopback message 604 which has a destination address set to a multicast MAC 330 towards the CPE 312'. The one DSLAM 310' is able to recognize the virtual MAC address 324 because it has the specific bridge port 315b' behind which there is located this particular CPE 312'. FIG. 8 is a diagram which illustrates the frame format of an exemplary multicast loopback message 604 with a DA set to multicast MAC 330.

6. The CPE 312' receives the multicast loopback message 604.

Figure 9:
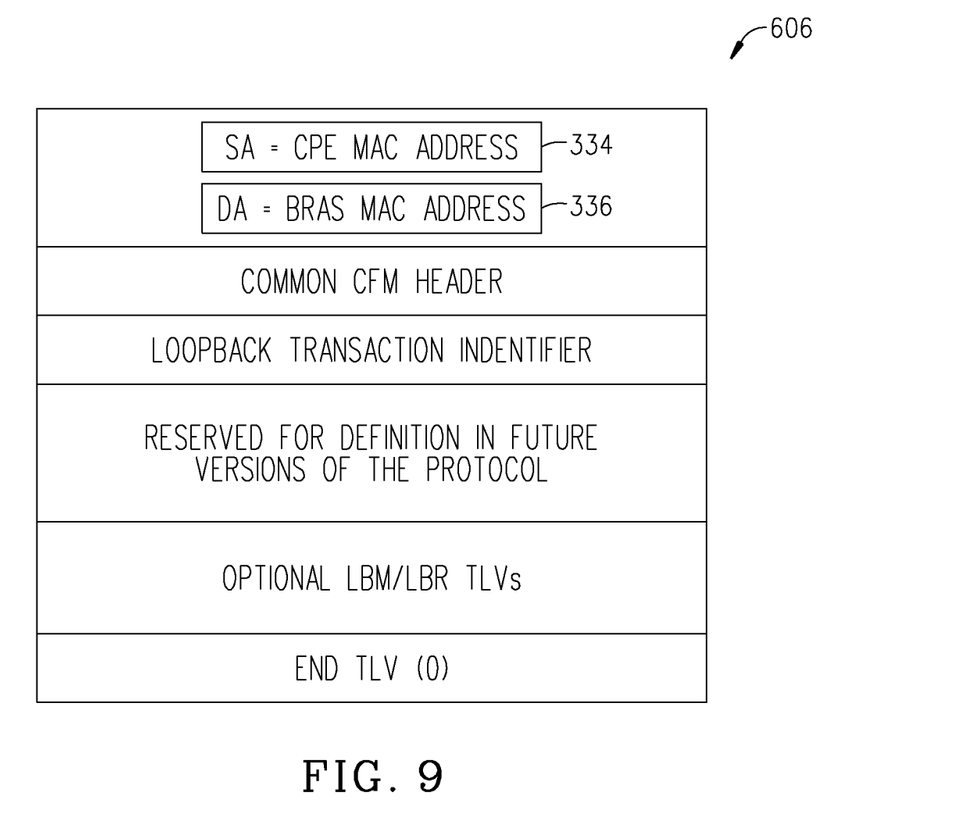
FIG. 9 is a diagram which illustrates the frame format of an exemplary unicast loopback reply message which is discussed with respect to the access network shown in FIG. 6 in accordance with the present invention.

7. The CPE 312' sends a unicast loopback reply message 606 with a source address set to the CPE's MAC address 334 and a destination address set to the BRAS's MAC address 336. FIG. 9 is a diagram which illustrates the frame format of an exemplary unicast loopback reply message 606 which has a SA set to the CPE's MAC address 334 and a DA set to the BRAS's MAC address 336.

8. The BRAS 304 receives only one unicast loopback reply message 606 and from this message is able to obtain the MAC address 334 of the CPE 312'. Once, the BRAS 304 has the CPE's MAC address 334 it is able to use Ethernet OAM tools to troubleshoot the CPE 312'.

Note 1: The present invention could be implemented as well in an access network that is based on a PON model in which case the DSLAM 310 would be replaced by an OLT and an ONT.

Note 2: The LB message 602 (excluding the virtual MAC address 324), the LB message 604 (excluding the multicast MAC 330) and the LBR message 606 (excluding the SA set to the CPE's MAC address 334 and the DA set to the BRAS's MAC address 336) are discussed in more detail in ITU-T Recommendation Y.1731 entitled "OAM Functions and Mechanisms for Ethernet Based Networks" May 2006 (the contents of which are hereby incorporated by reference herein).

From the foregoing, it should be appreciated that the present invention relates to an edge router 304 (e.g., BRAS 304) and a method 350 for obtaining a MAC address 334 of a particular end device 312 (e.g., consumer premises equipment 312). The basic idea is that each user bridgeport 315b (LT port on a DSLAM 310) gets a virtual MAC address 324 that represents the CPE 312 which is connected to this particular user bridgeport 315b. The virtual MAC address 324 is defined based on a bit-pattern containing a DSLAM-id identifying the DSLAM 310' and the physical position of a rack/shelf/slot/port (and possibly vpi/vci in ATM applications) of the particular port 315b' within this DSLAM 310' behind which the particular CPE 312 is connected. Alternatively, the virtual MAC address 324 can be any MAC address that can be agreed upon to represent the CPE 312'. Then, the BRAS 304 sends a unicast loopback message 602 (with the virtual MAC address 324) that is flooded within the access network 300a. The particular DSLAM 310' that receives this unicast loopback message 602 and recognizes this virtual MAC address 324 then forwards a multicast loopback message 604 to the CPE 312'. The CPE 312' then sends a unicast loopback reply message 606 which contains the real CPE MAC address 334 towards the BRAS 304. By addressing a specific CPE 312' and receiving just one reply from this CPE 312', there is no scalability issue because only one reply is sent to the BRAS 304 plus there is no security issue because the right CPE 312' is addressed and only the addressed CPE 312' can reply to the BRAS 304. This effectively addresses the aforementioned problems associated with the prior art.

Although one embodiment of the present invention has been illustrated in the accompanying Drawings and described in the foregoing Detailed Description, it should be understood that the present invention is not limited to the disclosed embodiment, but is capable of numerous rearrangements, modifications and substitutions without departing from the spirit of the invention as set forth and defined by the following claims.

The invention claimed is:

1. A method for obtaining a Media Access Control (MAC) address of a selected customer premises equipment (CPE) comprising:

storing a virtual MAC address, for all CPE in an access network, where each virtual MAC address represents a bridge port in one of a plurality of access nodes;

sending a unicast loopback message, with a destination address set to the virtual MAC address associated with the selected CPE, from the edge router towards the selected CPE;
receiving the unicast loopback message at all of the plurality of access nodes;
discarding the unicast loopback message at access nodes of the plurality of access nodes which do not recognize the virtual MAC address;
sending a multicast loopback message from one of the access nodes of the plurality of access nodes which recognizes the virtual MAC address toward the selected CPE, where the one access node has the bridge port that is associated with the CPE, and where the multicast loopback message has a destination address set to a multicast MAC address;
receiving the multicast loopback message at the selected CPE;
sending a unicast loopback reply message from the selected CPE to the edge router, where the unicast loopback reply message has a source address set to the MAC address of the selected CPE; and
receiving the unicast loopback reply message at the edge router so that the edge router is able to obtain the MAC address of the selected CPE.

2. A method for obtaining a Media Access Control (MAC) address of a selected end device, said method comprising the steps of:
obtaining a virtual MAC address that represents a bridge port in an access node behind which there is located a selected end device;
sending, from an edge router, a first connectivity fault management message with a destination address set to the virtual MAC address, wherein the access node receives the first connectivity fault management message and then sends a second connectivity fault management message with a destination address set to a multicast MAC address towards the selected end device; and
receiving, at the edge router, a third connectivity fault management message comprising a unicast message, from the selected end device where the third connectivity fault message has a source address that is set to the MAC address of the selected end device.

3. The method of claim 2, wherein said obtaining step further includes pre-configuring the edge router to store the virtual MAC address that represents the bridge port in the access node behind which there is located the selected end device.

4. The method of claim 2, wherein said obtaining step further includes using a known hierarchy of the access node to calculate the virtual MAC address that represents the bridge port in the access node behind which there is located the selected end device.

5. The method of claim 2, wherein said selected end device is a consumer premises equipment (CPE) device.

6. The method of claim 2, wherein said access node includes:
a Digital Subscriber Line Access Multiplexer; or
an Optical Line Termination-Optical Network Termination.

7. The method of claim 2, wherein said virtual MAC address is defined by an identification number of the access node and a physical location of the bridge port in the access node.

8. The method of claim 7, wherein said physical location of the bridge port is represented by a rack-shelf-slot-port identification.

9. An edge router, comprising:
a processor; and
a memory, where said processor retrieves instructions from said memory and processes those instructions to enable the following:
obtaining a virtual MAC address that represents a bridge port in an access node behind which there is located a selected end device;
sending a first connectivity fault management message with a destination address set to the virtual MAC address associated with the selected end device, wherein an access node receives the first connectivity fault management message and then sends a second connectivity fault management message from the associated bridge port to the selected end device with a destination address set to a multicast MAC address; and
receiving a third connectivity fault management message comprising a unicast message from the selected end device, where the third connectivity fault message has a source address that is set to the MAC address of the selected end device.

10. The edge router of claim 9, wherein said processor enables the obtaining operation by pre-configuring the memory to store the virtual MAC address that represents the bridge port in the access node behind which there is located the selected end device.

11. The edge router of claim 9, wherein said processor enables the obtaining operation by using a known hierarchy of the access node to calculate the virtual MAC address that represents the bridge port in the access node behind which there is located the selected end device.

12. The edge router of claim 9, wherein:
said first connectivity fault management message is a unicast loopback message;
said second connectivity fault management message is a multicast loopback message; and
said third connectivity fault management message is a unicast loopback reply message.

13. The edge router of claim 9, wherein said virtual MAC address is defined by an identification number of the access node and a physical location of the bridge port in the access node.

14. The edge router of claim 13, wherein said physical location of the bridge port is represented by a rack-shelf-slot-port identification.

15. A method for obtaining a Media Access Control (MAC) address of a selected end device which is part of an access system that also includes an edge router and a plurality of access nodes, said method comprising the steps of:
obtaining a virtual MAC address at the edge router, where the virtual MAC address represents a bridge port in one of the access nodes behind which there is located the selected end device;
sending a unicast loopback message with a destination address set to the virtual MAC address from the edge router towards the end device;
receiving the unicast loopback message at all of the access nodes;
discarding the unicast loopback message at the access nodes which do not recognize the virtual MAC address;
sending a multicast loopback message from one of the access nodes which recognized the virtual MAC address toward the selected end device, where the one access node has the bridge port behind which there is located the selected end device, and where the multicast loopback message has a destination address set to a multicast MAC address;

receiving the multicast loopback message at the selected end device;

sending a unicast loopback reply message from the selected end device, where the unicast loopback reply message has a source address set to the MAC address of the selected end device; and receiving the unicast loopback reply message at the edge router so that the edge router is able to obtain therefrom the MAC address of the selected end device.

16. The method of claim 15, further comprising a step pre-configuring the edge router to store the virtual MAC address that represents the bridge port in the one access node behind which there is located the selected end device.

17. The method of claim 15, further comprising a step of enabling the edge router to use a known hierarchy of the one access node to calculate the virtual MAC address that represents the bridge port in the one access node behind which there is located the selected end device.

18. The method of claim 15, wherein said virtual MAC address is defined by an identification number of the one access node and a rack-shelf-slot-port identification associated with the bridge port which is part of the one access node.

19. The method of claim 15, wherein each access node includes:
 a Digital Subscriber Line Access Multiplexer; or
 an Optical Line Termination-Optical Network Termination.

\* \* \* \* \*